United States Patent
Lin (10) Patent No.: US 10,705,386 B2
(45) Date of Patent: Jul. 7, 2020

(54) METHOD FOR AVOIDING AN IMAGE STICKING EFFECT AND DISPLAY SYSTEM CAPABLE OF DYNAMICALLY ROTATING PIXEL MOLECULES

(71) Applicants: BenQ Intelligent Technology (Shanghai) Co., Ltd, Shanghai (CN); BENQ CORPORATION, Taipei (TW)

(72) Inventor: Hsin-Nan Lin, Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 0 days.

(21) Appl. No.: 16/558,139

(22) Filed: Sep. 1, 2019

(65) Prior Publication Data

US 2020/0073160 A1    Mar. 5, 2020

(30) Foreign Application Priority Data

Sep. 3, 2018 (CN) .......................... 2018 1 1022913

(51) Int. Cl.
*G09G 3/36* (2006.01)
*G02F 1/1337* (2006.01)
*G02F 1/1333* (2006.01)

(52) U.S. Cl.
CPC .......... *G02F 1/1337* (2013.01); *G09G 3/3648* (2013.01); *G02F 2001/133397* (2013.01)

(58) Field of Classification Search
CPC .......... G09G 3/3614–3696; G09G 2300/0823; G09G 2310/0254; G09G 2310/068
See application file for complete search history.

(56) References Cited

U.S. PATENT DOCUMENTS

| | | | |
|---|---|---|---|
| 2008/0100602 A1* | 5/2008 | Arai | G09G 3/3614 345/205 |
| 2008/0284704 A1* | 11/2008 | Song | G09G 3/3614 345/94 |
| 2009/0027321 A1 | 1/2009 | Kobashi | |
| 2011/0109666 A1* | 5/2011 | Owa | G09G 3/3685 345/690 |
| 2018/0047351 A1* | 2/2018 | Yan | G02F 1/1343 |
| 2018/0210244 A1 | 7/2018 | Hirayama | |

FOREIGN PATENT DOCUMENTS

| | | |
|---|---|---|
| CN | 101689347 A | 3/2010 |
| CN | 104798126 A | 7/2015 |
| KR | 10-0761134 B1 | 9/2007 |
| TW | 201802792 A | 1/2018 |

\* cited by examiner

*Primary Examiner* — Sanghyuk Park
(74) *Attorney, Agent, or Firm* — Winston Hsu (57) ABSTRACT

A method for avoiding an image sticking effect includes acquiring a color tone status of an image during a predetermined time interval according to an input signal of a liquid crystal display panel, rotating pixel molecules of at least one region of a plurality of regions of the image by using a pixel inversion process when the color tone status is maintained at a steady state, and after the pixel molecules of the at least one region of the image are rotated, suspending the pixel inversion process of the image when the color tone status is changed from the steady state to an unstable state.

17 Claims, 5 Drawing Sheets

METHOD FOR AVOIDING AN IMAGE STICKING EFFECT AND DISPLAY SYSTEM CAPABLE OF DYNAMICALLY ROTATING PIXEL MOLECULES

BACKGROUND OF THE INVENTION

1. Field of the Invention

The present invention illustrates a method for avoiding an image sticking effect and a display system, and more particularly, a method for avoiding an image sticking effect and a display system capable of dynamically rotating pixel molecules.

2. Description of the Prior Art

Liquid crystal display (LCD) and organic light emitting diode (OLED) devices have been widely used in our daily life because they take advantages of thin appearance, low power consumption, and no radiation. For example, the LCD and OLED devices can be applied to multimedia players, mobile phones, personal digital assistants, computer monitors, or flat-screen TVs.

Pixels of the liquid crystal display device are elements having liquid crystal molecules. When the liquid crystal molecules are used for a display panel, an image can be generated by using an electro-optical effect and an optical rotation property of the liquid crystal molecules. The electro-optical effect refers to a transformation from certain allocations of the liquid crystal molecules to other allocations of the liquid crystal performed by using an electric field, thereby resulting variations of optical characteristics of a liquid crystal film of the display panel. The optical rotation property refers to a rotation of a polarization plane of each liquid crystal molecule when an optical signal passes through the liquid crystal molecules. Further, the liquid crystal molecules have a special characteristic, as illustrated below. In general, when the liquid crystal molecules are driven by an extremely high DC (direct current) power or driven by a DC power for a long time, the liquid crystal molecules may be damaged, thereby losing correlations between a driving voltage and a light transmittance. Therefore, an alternating current (AC) power is often used for driving the crystal molecules for avoiding generating unexpected optical characteristics of the liquid crystal molecules.

However, when the liquid crystal display device displays an image with a color tone status under a steady state for a long time (i.e., for example, an input signal is absent, or the input signal is blocked), an afterimage effect may be displayed on the liquid crystal display device. This phenomenon is called as an image sticking effect. In other words, after the liquid crystal molecules are idled for a long time, the liquid crystal molecules may be elastically fatigued. Therefore, the displayed image is prone to introduce unpleasant image sticking patterns.

SUMMARY OF THE INVENTION

In an embodiment of the present invention, a method for avoiding image sticking effect is disclosed. The method comprises acquiring a color tone status of an image during a predetermined time interval according to an input signal of a liquid crystal display panel, rotating pixel molecules of at least one region of a plurality of regions of the image by using a pixel inversion process when the color tone status is maintained at a steady state, and after the pixel molecules of the at least one region of the image are rotated, suspending the pixel inversion process of the image when the color tone status is changed from the steady state to an unstable state. When the color tone status is maintained at the steady state during a steady image interval, the liquid crystal display panel is prone to triggering the image sticking effect. A length of the predetermined time interval is smaller than a length of the steady image interval.

In another embodiment of the present invention, a display system is disclosed. The display system comprises a liquid crystal display panel, a processor, and a memory. The liquid crystal display panel is configured to display an image. The processor is coupled to the liquid crystal display panel and configured to optionally rotate pixel molecules of the image according to a color tone status of the image. The memory is coupled to the processor and configured to save a plurality of parameters of rotating the pixel molecules of the image. The processor acquires the color tone status of the image during a predetermined time interval according to an input signal of the liquid crystal display panel, rotates pixel molecules of at least one region of a plurality of regions of the image by using a pixel inversion process when the color tone status is maintained at a steady state. After the pixel molecules of the at least one region of the image are rotated, the processor suspends the pixel inversion process of the image when the color tone status is changed from the steady state to an unstable state. When the color tone status is maintained at the steady state during a steady image interval, the liquid crystal display panel is prone to triggering the image sticking effect. A length of the predetermined time interval is smaller than a length of the steady image interval.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
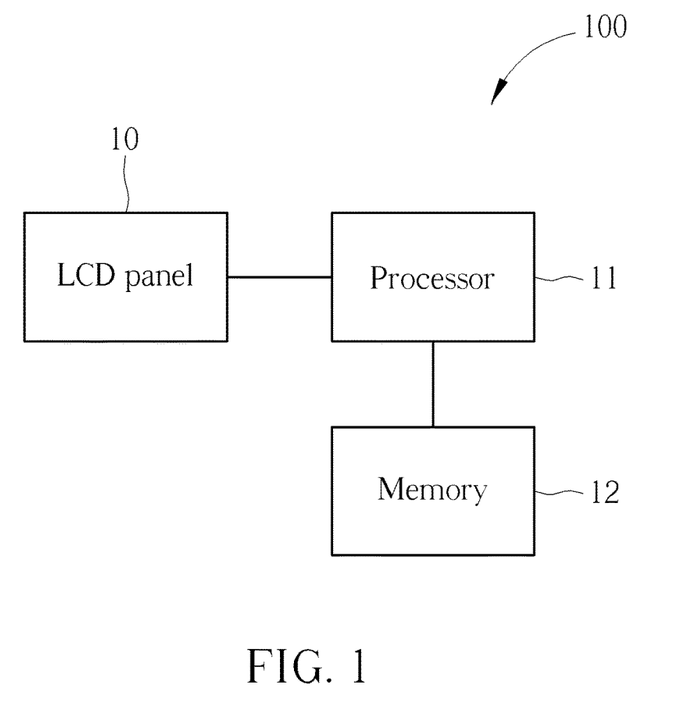
FIG. 1 is a structure of a display system according to an embodiment of the present invention.

FIG. 1 is a structure of a display system 100 according to an embodiment of the present invention. The display system 100 includes a liquid crystal display (LCD) panel 10, a processor 11, and a memory 12. The LCD panel 10 is used for displaying an image. The LCD panel 10 can include a plurality of pixels. Further, an electro-optical effect and an optical rotation property of the liquid crystal molecules in each pixel are introduced. Allocations of the liquid crystal molecules of all pixels (hereafter, say "pixel molecules") can be changed by using an electric field, thereby resulting in variations of optical characteristics of the pixel molecules of the LCD panel 10. The processor 11 is coupled to the LCD panel 10 for optionally rotating the pixel molecules of the image according to a color tone status of the image. The processor 11 can be any type of programmable devices, such as a central processing unit, a scaler, or a microprocessor. The processor 11 can acquire an input signal (i.e., such as a video data signal) inputted to the LCD panel 10. In other words, the input signal acquired by the processor 11 can be regarded as a "raw" image data inputted to the LCD panel 10. Therefore, the input signal is irrelevant to color distortion, data delay, color tone offset, or any special effect of the LCD panel 10. The memory 12 is coupled to the processor 11 for saving a plurality of parameters of rotating the pixel molecules of the image. For example, the plurality of parameters saved in the memory 12 can include a shape and a pixel amount of each region of the plurality of regions of the image, and/or a period of rotating the pixel molecules of the at least one region of the plurality of regions of the image, as illustrated later. In the display system 100, the LCD panel 10, the processor 11, and the memory 12 can be integrated inside a display device or monitor device housed by a housing. The processor 11 can acquire the color tone status of the image during a predetermined time interval according to the input signal of the LCD panel 10. A definition of the input signal can be any video communication data signal, such as a video graphics array (VGA) signal, a high definition multimedia interface (HDMI) signal, or a display port (DP) signal. When the color tone status of the image is maintained at a steady state, the processor 11 can rotate pixel molecules of at least one region of a plurality of regions of the image by using a pixel inversion process. Here, a purpose of rotating the pixel molecules is to avoid elastic fatigue of the pixel molecules of the LCD panel 10. After the pixel molecules of at least one region of the image are rotated, when the color tone status of the image is changed from the steady state to an unstable state, it implies that the LCD panel 10 starts to display the image with at least one motioned object according to the input signal. Therefore, the processor 11 can temporarily suspend the pixel inversion process of the image. A method of rotating the pixel molecules for avoiding the elastic fatigue of the pixel molecules of the LCD panel 10 is illustrated below.

Figure 2:
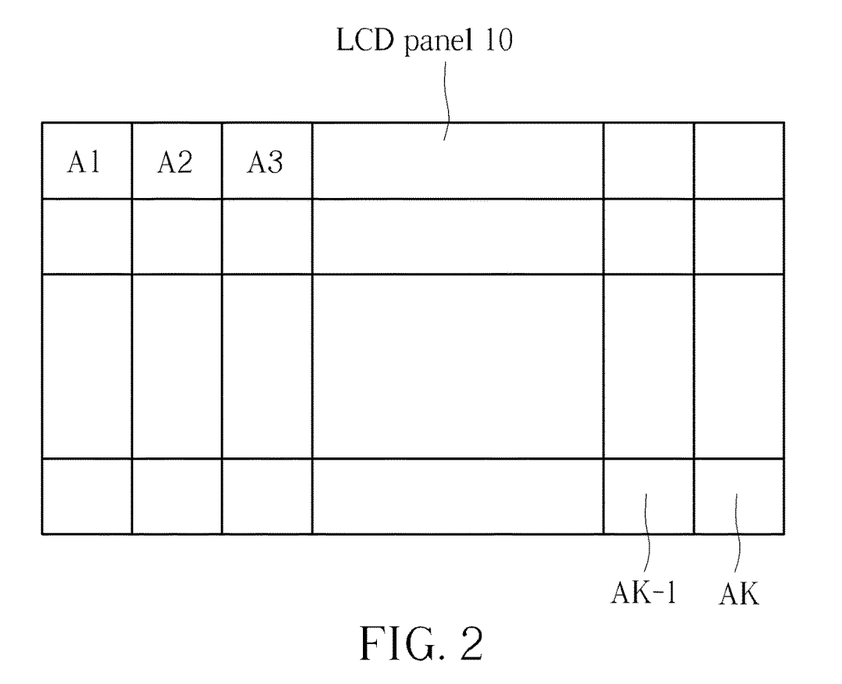
FIG. 2 is an illustration of partitioning an image displayed on a liquid crystal display panel into a plurality of regions of the display system in FIG. 1.

FIG. 2 is an illustration of partitioning the image displayed on the LCD panel 10 into the plurality of regions A1 to AK of the display system 100. In the display system 100, the processor 11 can virtually partition the image displayed on the LCD panel 10 into the plurality of regions A1 to AK. K is a positive integer. Each region can be a square region including M pixels. M is a positive integer. Further, when a resolution of the LCD panel 10 becomes large, the number of pixels in each region can be increased. For example, the LCD panel 10 includes N pixels. When the LCD panel 10 displays an image with a full high definition (FHD) quality, N can be equal to 1920×1080. Here, the number of pixels in each region can be set equal to four, as M=4. Therefore, the image displayed on the LCD panel 10 can be partitioned into (1920×1080)/4=518400 regions, as K=N/M=518400. Here, since the resolution N of the image can be partitioned by the plurality of "M pixels" based regions, N is greater than M. N is a multiple of M. However, the display system 100 is not limited to using an aforementioned method for generating the plurality of regions A1 to AK. For example, the plurality of regions A1 to AK can be square regions with different sizes. The plurality of regions A1 to AK can be linear regions, dotted regions, or can be integrated into a full-screen region (K=1). Any reasonable technology modification falls into the scope of the present invention. For simplicity, in the following illustrations, all regions are assumed to include the same number of pixels, as M pixels in each region. In FIG. 2, after the processor 11 virtually partitions the image displayed on the LCD panel 10 into the plurality of regions A1 to AK, the processor 11 can periodically rotate the pixel molecules of the at least one region randomly selected from the plurality of regions A1 to AK of the image. For example, the processor 11 can generate a random sequence, such as A1, A3, AK-1, A2, . . . . Then, the processor 11 can sequentially rotate the pixel molecules of partial or entire pixels of regions A1, A3, AK-1, A2, . . . according to the random sequence. Further, the processor 11 can periodically rotate the pixel molecules of partial or entire pixels of the plurality of regions A1 to AK in sequence (i.e., A1, A2, . . . , AK). Further, the processor 11 can rotate the pixel molecules of partial or entire pixels of the at least one region of the plurality of regions A1 to AK simultaneously. Further, the processor 11 can rotate the pixel molecules of partial or entire pixels of some specific, predetermined or randomly selected regions simultaneously. Further, the processor 11 can rotate the pixel molecules of all pixels of a full-screen image displayed on the LCD panel 10. For example, when each region only includes one pixel (M=1), the processor 11 can rotate the pixel molecules of all regions by performing a pixel frame-inversion process. Any reasonable method of rotating the pixel molecules falls into the scope of the present invention. After the pixel molecules are rotated, the elasticity of the pixel molecules can be recovered. Therefore, the image sticking effect caused by elastic fatigue of the pixel molecules can be avoided.

Figure 3:
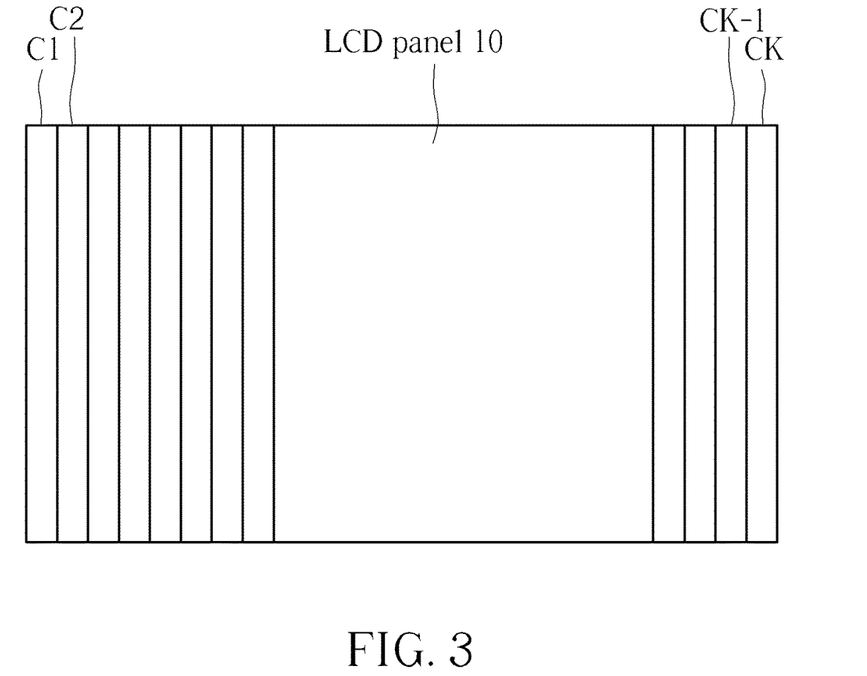
FIG. 3 is an illustration of partitioning the image displayed on the liquid crystal display panel into a plurality of column-based linear regions of the display system in FIG. 1.
Figure 4:
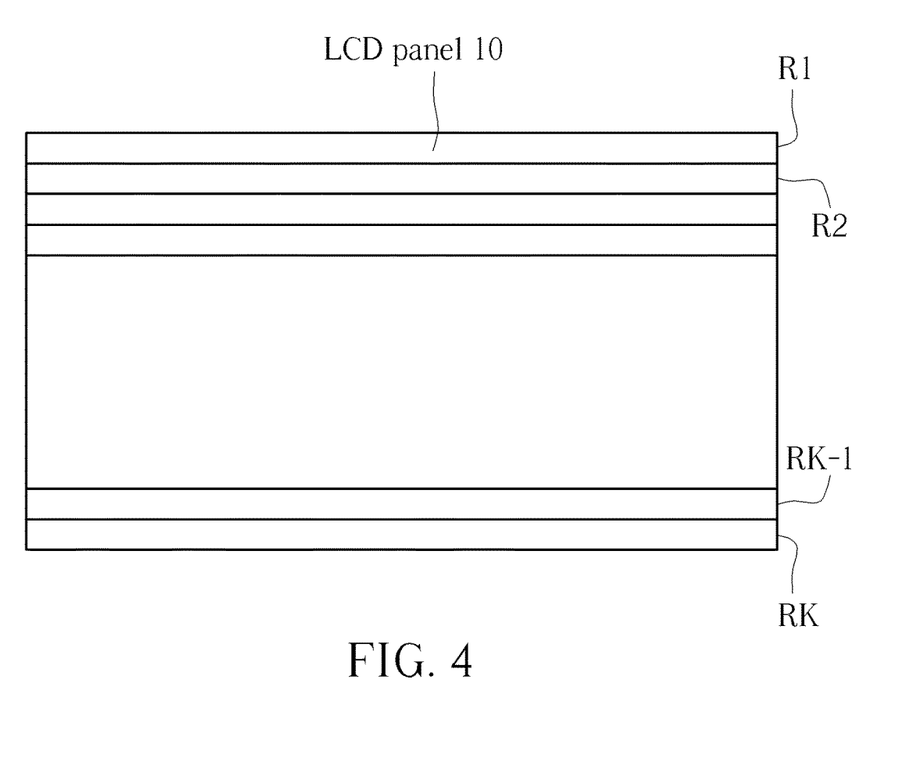
FIG. 4 is an illustration of partitioning the image displayed on the liquid crystal display panel into a plurality of row-based linear regions of the display system in FIG. 1.

FIG. 3 is an illustration of partitioning the image displayed on the LCD panel 10 into a plurality of column-based linear regions C1 to CK of the display system 100. FIG. 4 is an illustration of partitioning the image displayed on the LCD panel 10 into a plurality of row-based linear regions R1 to RK of the display system 100. As previously mentioned, the plurality of regions A1 to AK can be designed as linear regions. Therefore, in FIG. 3, the image displayed on the LCD panel 10 can be virtually partitioned by the processor 11 into the plurality of column-based linear regions C1 to CK. A dimension of each column-based linear region can be M×1. Therefore, the processor 11 can rotate pixel molecules of partial or entire pixels of column-based linear regions C1 to CK. Further, the processor 11 can rotate pixel molecules of partial or entire pixels of at least one column-based linear region randomly selected from the column-based linear regions C1 to CK. In FIG. 4, the image displayed on the LCD panel 10 can be virtually partitioned by the processor 11 into the plurality of row-based linear regions R1 to RK. A dimension of each row-based linear region can be 1×M. Therefore, the processor 11 can rotate pixel molecules of partial or entire pixels of row-based linear regions R1 to RK. Further, the processor 11 can rotate pixel molecules of partial or entire pixels of at least one row-based linear region randomly selected from the row-based linear regions R1 to RK.

As previously mentioned, the plurality of regions A1 to AK can be the linear regions, the dotted regions, or can be integrated into the full-screen region (K=1). When the plurality of regions A1 to AK are designed as the dotted regions, the processor 11 can use a pixel dot-inversion process for rotating the pixel molecules of at least one region. When the plurality of regions A1 to AK are designed as the linear regions, the processor 11 can use a pixel column-inversion process or a pixel row-inversion process for rotating the pixel molecules of at least one region. When the plurality of regions A1 to AK are integrated into the full-screen region, the processor 10 can rotate pixel molecules of all regions of the image by using a pixel frame-inversion process. After the pixel molecules are rotated, the elasticity of the pixel molecules can be recovered. Therefore, the image sticking effect caused by elastic fatigue of the pixel molecules can be avoided.

Figure 5:
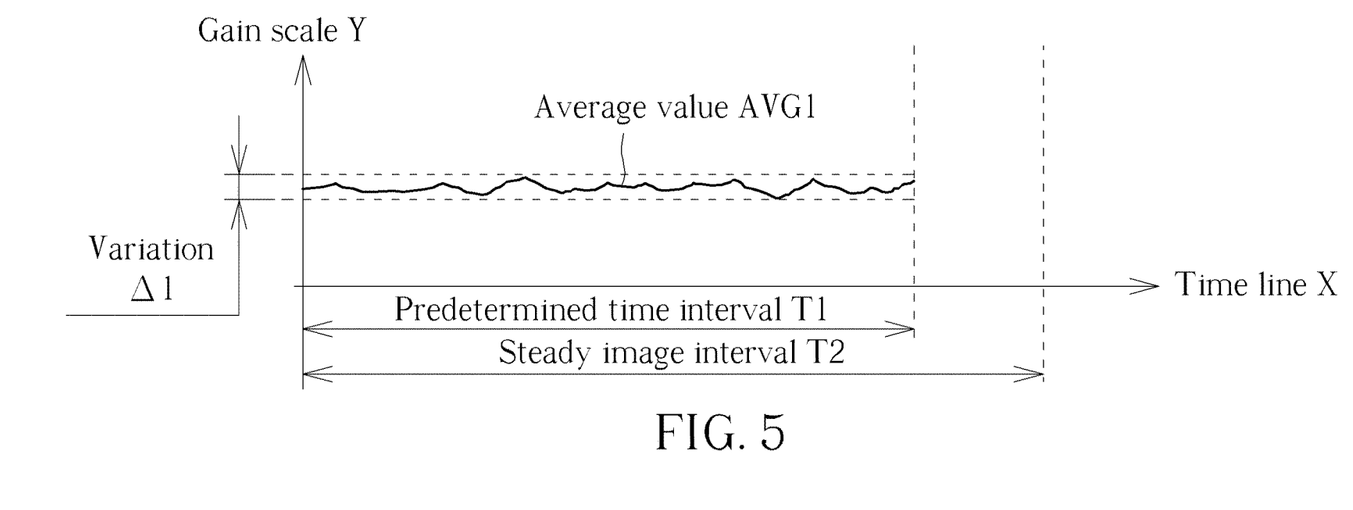
FIG. 5 is an illustration of a variation of an average color gain over time when a color tone status of the image of the display system in FIG. 1 is maintained at a steady state.

FIG. 5 is an illustration of a variation Δ1 of an average color gain AVG1 over time when a color tone status of the image of the display system 100 is maintained at a steady state. X-axis is denoted as a time line. Y-axis is denoted as a gain scale. As previously mentioned, when the color tone of the image status is maintained at the steady state, the processor 11 can rotate the pixel molecules of the at least one region of the plurality of regions of the image. In the following, a method for detecting the color tone status of the image is illustrated. First, the processor 11 can continuously acquire parameters with three-primary colors of each pixel of the image during a predetermined time interval T1 according to the input signal of the LCD panel 10. Then, the processor 11 can generate the average color gain AVG1 (say, an average value AVG1 hereafter) of parameters with at least one primary color according to the parameters with three-primary colors of all pixels of the image. For example, the LCD panel 10 includes N pixels. When the LCD panel 10 displays the image with the full high definition (FHD) quality, N can be equal to 1920×1080. Therefore, pixels of the LCD panel 10 can be denoted as $P_1, P_2, \ldots, P_{1920\times1080}$. Each pixel has its own parameters with three-primary colors. Here, the parameters with three-primary colors can be defined as parameters with red color, green color, and blue color. A definition of the "parameters" in each pixel can be color gain scales or color coordinates of each pixel. Therefore, the parameters with three-primary colors of pixels of the image displayed on the LCD panel 10 can be denoted as $P_1$ ($R_1$, $B_1$, $G_1$), $P_2$ ($R_2$, $B_2$, $G_2$), $P_{1920\times1080}$ ($R_{1920\times1080}$, $B_{1920\times1080}$, $G_{1920\times1080}$). Then, the processor 11 can generate the average value AVG1 of parameters with at least one primary color according to the parameters with three-primary colors of the LCD panel 10. For example, an average value of parameters with red color can be generated as $$(1/(1920\times1080))\times\left(\sum_{n=1}^{1920\times1080} R_n\right).$$

An average value of parameters with green color can be generated as $$(1/(1920\times1080))\times\left(\sum_{n=1}^{1920\times1080} G_n\right).$$

An average value of parameters with blue color can be generated as $$(1/(1920\times1080))\times\left(\sum_{n=1}^{1920\times1080} B_n\right).$$

An average value of parameters with red color and green color can be generated as $$(1/(1920\times1080))\times\sum_{n=1}^{1920\times1080} (R_n+G_n)/2.$$

An average value of parameters with green color and blue color can be generated as $$(1/(1920\times1080))\times\sum_{n=1}^{1920\times1080} (G_n+B_n)/2.$$

An average value of parameters with red color and blue color can be generated as $$(1/(1920\times1080))\times\sum_{n=1}^{1920\times1080} (R_n+B_n)/2.$$

An average value of parameters with all primary colors can be generated as $$(1/(1920\times1080))\times\sum_{n=1}^{1920\times1080} (R_n+G_n+B_n)/3.$$

In the display system 100, a user can dynamically adjust an appropriate method for generating an average value according to the content of the image for reducing computational complexity. For example, when an image is a landscape image with a blue sky object and a white cloud object, the user can specify the average value AVG1 as the average value of parameters with blue color for reducing computational complexity. However, in general case, in order to avoid generating an erroneous color tone status of the image caused by ignoring certain color parameters, the average value AVG1 of parameters with all primary colors is generally used, as $$AVG1 = \left(\frac{1}{1920\times1080}\right)\times\left(\sum_{n=1}^{1920\times1080}\frac{R_n+G_n+B_n}{3}\right)$$

In other words, when the LCD panel 10 displays an image with a resolution equal to N, the average value AVG1 can be derived as $$AVG1 = \left(\frac{1}{N}\right)\times\left(\sum_{n=1}^{N}\frac{R_n+G_n+B_n}{3}\right)$$

In the display system 100, the processor 11 can continuously generate the variation Δ1 of the average value AVG1 over time. Here, the input signal of the LCD panel 10 may be slightly varied due to electromagnetic wave interference, thermal noise, or voltage fluctuation. In other words, even if the image is displayed under the steady state, the average value AVG1 of the color tone may slightly fluctuate. Therefore, after the processor 11 continuously generate the average value AVG1 of the color tone during the predetermined time interval T1, the processor 11 can further generate the variation Δ1 of the average value AVG1. Further, the processor 11 can rotate the pixel molecules of the at least one region of the plurality of regions of the image by using the pixel inversion process when the variation Δ1 of the average value AVG1 of the parameters with the at least one primary color during the predetermined time interval T1 is smaller than a threshold (i.e., such as the variation Δ1 is smaller than a 5%~10% maximum average value). In FIG. 5, after a steady image interval T2 elapses, the LCD panel 10 is prone to triggering the image sticking effect. The predetermined time interval T1 and the steady image interval T2 can be saved in the memory 12. Further, a length of the predetermined time interval T1 is smaller than a length of the steady image interval T2. A reason is illustrated below. After the pixel molecules are idled for a long time, the pixel molecules may be elastically fatigued. A time length requirement of triggering an elastic fatigue effect of the liquid crystal molecules can be regarded as the length of the steady image interval T2. For example, the steady image interval T2 can be 30 minutes. In order to avoid triggering the image sticking effect, the pixel molecules cannot be idled for a long time. Therefore, the length of the predetermined time interval T1 has to be smaller than the length of the steady image interval T2. When the processor 11 detects that the image is displayed under the steady state within the predetermined time interval T1 but the pixel molecules are not elastically fatigued yet, the processor 11 can rotate the pixel molecules of at least one region of the plurality of regions of the image for recovering the elasticity of the pixel molecules. By doing so, the elasticity of the pixel molecules can be maintained for avoiding the image sticking effect.

Figure 6:
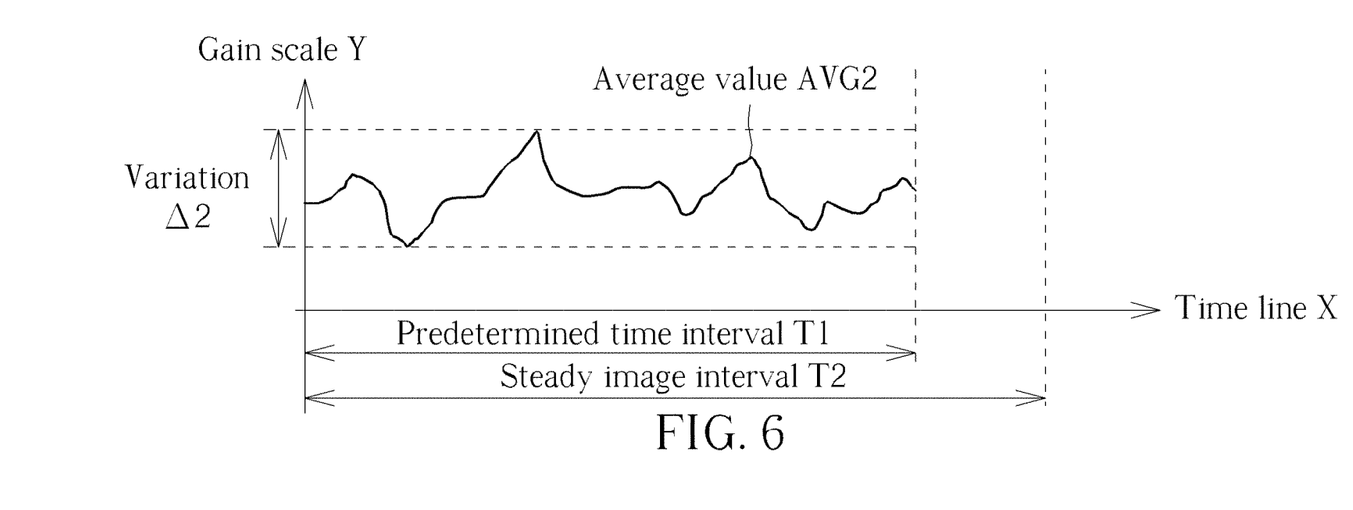
FIG. 6 is an illustration of a variation of an average color gain over time when the color tone status of the image of the display system in FIG. 1 is changed to an unstable state.

FIG. 6 is an illustration of a variation Δ2 of an average color gain AVG2 over time when the color tone status of the image of the display system 100 is changed to an unstable state. X-axis is denoted as the time line. Y-axis is denoted as the gain scale. The average color gain AVG2 is called as an average value AVG2 hereafter. As previously mentioned, the average value AVG2 can be regarded as an average value of parameters with at least one primary color according to the parameters with three-primary colors of all pixels of the image. After the processor 11 continuously generate the average value AVG2 of the color tone during the predetermined time interval T1, the processor 11 can further generate the variation Δ2 of the average value AVG2. When the variation Δ2 of the average value AVG2 of the parameters with the at least one primary color during the predetermined time interval T1 is greater than a threshold (i.e., such as the variation Δ2 is greater than the 5%~10% maximum average value), it implies that the color tone status of the image is unstable. Therefore, in FIG. 6, even if the steady image interval T2 elapses, no image sticking effect is introduced. In other words, since the color tone status of the image is unstable, the pixel molecules are also unstable. Thus, the pixel molecules are not elastically fatigued. In FIG. 6, since the pixel molecules are not elastically fatigued, the processor 11 can suspend the pixel inversion process of the image. Further, the processor 11 can continuously monitor the color tone status of the image for avoiding the image sticking effect caused by elastic fatigue of the pixel molecules.

Figure 7:
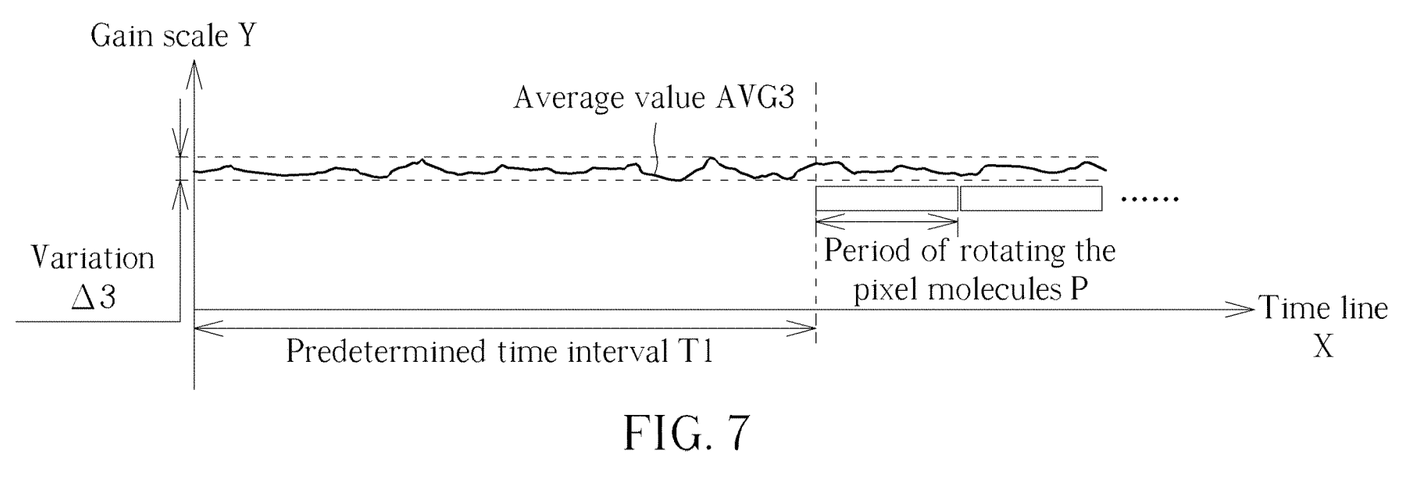
FIG. 7 is an illustration of rotating pixel molecules under a first mode when the color tone status of the image of the display system in FIG. 1 is maintained at the steady state.

FIG. 7 is an illustration of rotating pixel molecules under a first mode when the color tone status of the image of the display system 100 is maintained at the steady state. As previously mentioned, when a variation Δ3 of the average value during the predetermined time interval T1 is smaller than the threshold, it implies that the color tone status of the image is under the steady state. The processor 11 can rotate the pixel molecules of the at least one region of the plurality of regions of the image. For example, the processor 11 can randomly or non-randomly rotate the pixel molecules of the at least one region. A period of rotating the pixel molecules by the processor 11 can be denoted as P. P can be a number with a range from several milliseconds to several seconds. When the processor 11 rotates the pixel molecules, the processor 11 can continuously generate an average value AVG3 of the color tone gains and the variation Δ3 of the average value AVG3 over time. When the variation Δ3 of the average value AVG3 is smaller than the threshold, it implies that the image is stationary. Then, the processor 11 can periodically perform the pixel inversion process (with the period P). Further, when the image is stationary for a long time, a gap between two starting times for performing the pixel inversion process can be user-defined. However, the gap between two starting times for performing the pixel inversion process must be smaller than the length of the steady image interval T2 for avoiding triggering the image sticking effect caused by the elastic fatigue of the pixel molecules.

Figure 8:
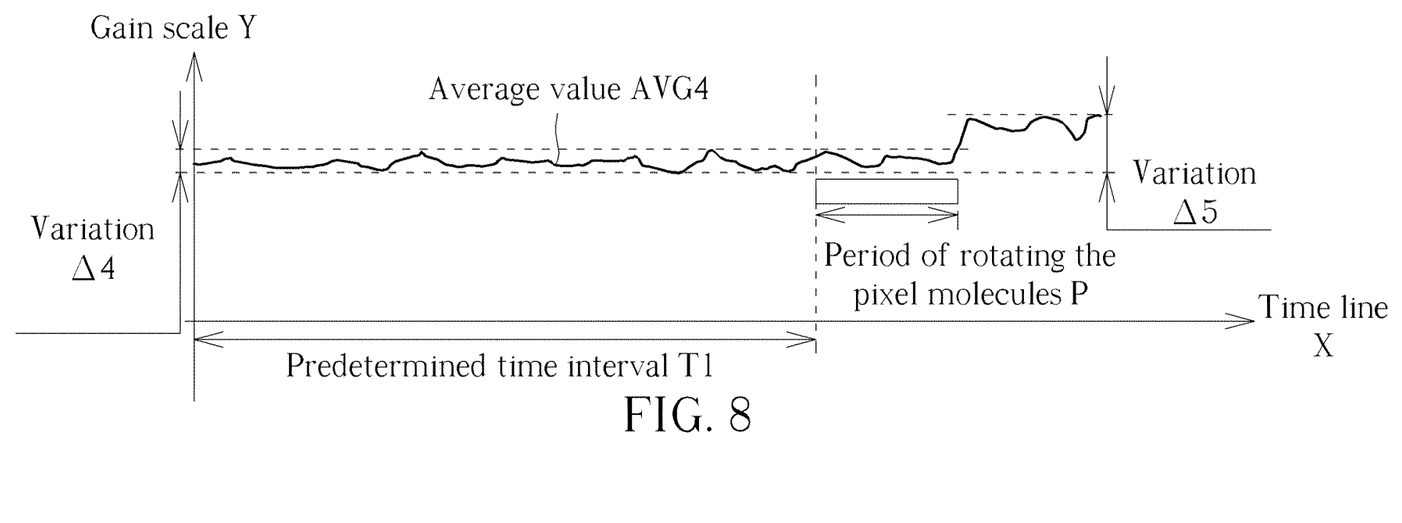
FIG. 8 is an illustration of rotating pixel molecules under a second mode when the color tone status of the image of the display system in FIG. 1 is maintained at the steady state.

FIG. 8 is an illustration of rotating pixel molecules under a second mode when the color tone status of the image of the display system 100 is maintained at the steady state. As previously mentioned, when a variation Δ4 of the average value during the predetermined time interval T1 is smaller than the threshold, it implies that the color tone status of the image is under the steady state. The processor 11 can rotate the pixel molecules of the at least one region of the plurality of regions of the image. The processor 11 can randomly or non-randomly rotate the pixel molecules of the at least one region. The period of rotating the pixel molecules by the processor 11 can be denoted as P. P can be the number with the range from several milliseconds to several seconds. When the processor 11 rotates the pixel molecules, the processor 11 can continuously generate an average value AVG4 of the color tone gains and the variation Δ4 of the average value AVG4 over time. IN FIG. 8, after the pixel inversion process is performed, the variation Δ4 of the average value AVG4 is increased to a variation Δ5. When the variation Δ5 of the average value AVG4 is greater than the threshold, it implies that the image becomes non-stationary. When the image is non-stationary, the elasticity of the pixel molecules is not fatigued. In FIG. 8, after the processor 11 performs the pixel inversion process (with the period P), the processor 11 can suspend the pixel inversion process of the image when the color tone status is changed from the steady state to the unstable state (i.e., the variation Δ5 is greater than the threshold).

Figure 9:
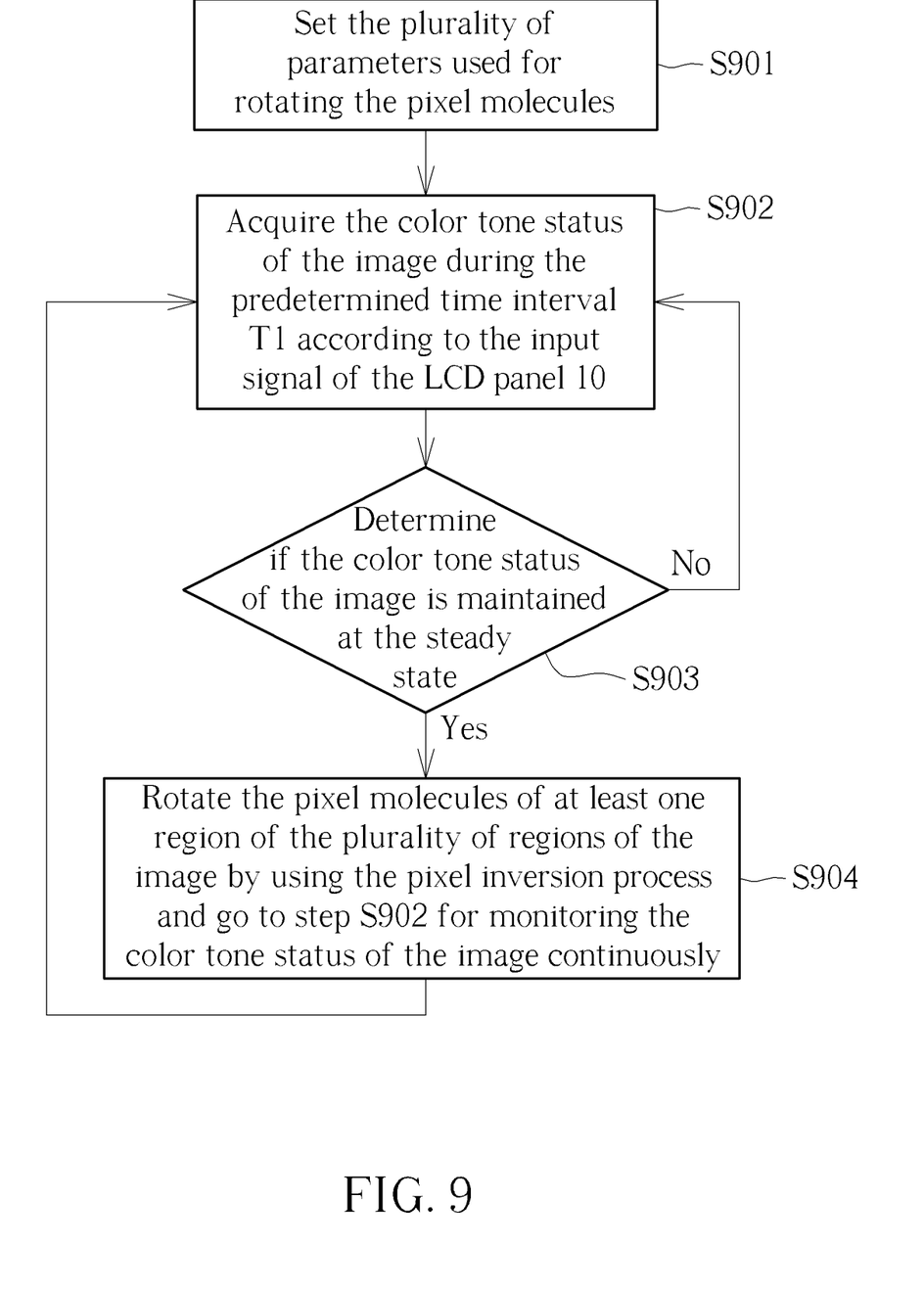
FIG. 9 is a flowchart of a method for avoiding an image sticking effect performed by the display system in FIG. 1.

FIG. 9 is a flow chart of a method for avoiding the image sticking effect performed by the display system 100. The method for avoiding the image sticking effect includes step S901 to step S904. Any reasonable technology modification falls into the scope of the present invention. Step S901 to step S904 are illustrated below.

step S901: set the plurality of parameters used for rotating the pixel molecules;

step S902: acquire the color tone status of the image during the predetermined time interval T1 according to the input signal of the LCD panel 10;

step S903: determine if the color tone status of the image is maintained at the steady state? if the color tone status becomes the unstable state, go to step S902; if the color tone status is maintained at the steady state, go to step S904;

step S904: rotate the pixel molecules of at least one region of the plurality of regions of the image by using the pixel inversion process and go to step S902 for monitoring the color tone status of the image continuously.

In step S901, the parameters used for rotating the pixel molecules can include a shape and a pixel amount of each region, a period of rotating the pixel molecules, and a mode of rotating the pixel molecules. In step S901, the plurality of parameters can be user-defined parameters or system default parameters. The plurality of parameters can be generated by using a lookup table according to a resolution of the image displayed on the LCD panel 10. Further, details of step S902 to step S904 are illustrated previously. Thus, they are omitted here. By performing step S901 to step S904, the display system 100 can avoid triggering the image sticking effect caused by elastic fatigue of the pixel molecules.

To sum up, the present invention discloses a display system capable of avoiding the image sticking effect. The display system can detect the color tone status of the image according to a variation of an average value of parameters with at least one primary color of all pixels of the image. When the image is stationary, since the color tone status of the image is maintained at the steady state, the display system can rotate pixel molecules of at least one region of the plurality of regions of the image for avoiding elastic fatigue of the pixel molecules. After the pixel molecules are rotated, the elasticity of the pixel molecules can be recovered. Therefore, the elastic fatigue of the pixel molecules can be avoided. Since the elastic fatigue of the pixel molecules can be avoided, the display system can also avoid generating unpleasant image sticking patterns on the displayed image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for avoiding an image sticking effect comprising:
    acquiring a color tone status of an image during a predetermined time interval according to an input signal of a liquid crystal display panel;
    rotating pixel molecules of at least one region of a plurality of regions of the image by using a pixel inversion process when the color tone status is maintained at a steady state; and
    after the pixel molecules of the at least one region of the image are rotated, suspending the pixel inversion process of the image when the color tone status is changed from the steady state to an unstable state;
    wherein when the color tone status is maintained at the steady state during a steady image interval, the liquid crystal display panel is prone to triggering the image sticking effect, and a length of the predetermined time interval is smaller than a length of the steady image interval.

2. The method of claim 1, wherein acquiring the color tone status of the image during the predetermined time interval according to the input signal of the liquid crystal display panel comprises:
    continuously acquiring parameters with three-primary colors of each pixel of the image during the predetermined time interval according to the input signal of the liquid crystal display panel; and
    generating an average value of parameters with at least one primary color according to the parameters with three-primary colors of all pixels of the image;
    wherein the parameters with at least one primary color are parameters with at least one of red color, green color, and blue color.

3. The method of claim 2, wherein rotating the pixel molecules of the at least one region of the plurality of regions of the image by using the pixel inversion process when the color tone status is maintained at the steady state comprises:
    rotating the pixel molecules of the at least one region of the plurality of regions of the image by using the pixel inversion process when a variation of the average value of the parameters with the at least one primary color during the predetermined time interval is smaller than a threshold.

4. The method of claim 1, wherein acquiring the color tone status of the image during the predetermined time interval according to the input signal of the liquid crystal display panel comprises:
    continuously acquiring parameters with three-primary colors of each pixel of the image during the predetermined time interval according to the input signal of the liquid crystal display panel; and
    generating an average value of the parameters with three-primary colors of all pixels of the image.

5. The method of claim 1, further comprising:
    setting a shape of each region of the plurality of regions of the image;
    setting a pixel amount of the each region of the plurality of regions of the image; and
    setting a period of rotating the pixel molecules of the at least one region of the plurality of regions of the image;
    wherein rotating the pixel molecules of the at least one region of the plurality of regions of the image, is periodically rotating the pixel molecules of the at least one region randomly selected from the plurality of regions of the image.

6. The method of claim 1, wherein rotating the pixel molecules of the at least one region of the plurality of regions of the image, is rotating the pixel molecules of partial or entire pixels of the at least one region of the plurality of regions of the image simultaneously.

7. The method of claim 1, wherein when the plurality of regions are dotted regions, the pixel inversion process is a pixel dot-inversion process, and when the plurality of regions are linear regions, the pixel inversion process is a pixel column-inversion process or a pixel row-inversion process.

8. The method of claim 1, wherein rotating the pixel molecules of the at least one region of the plurality of regions of the image by using the pixel inversion process when the color tone status is maintained at the steady state, is rotating the pixel molecules of all regions of the image by using a pixel frame-inversion process when the color tone status is maintained at the steady state.

9. A display system comprising:
    a liquid crystal display panel configured to display an image;
    a processor coupled to the liquid crystal display panel and configured to optionally rotate pixel molecules of the image according to a color tone status of the image; and a memory coupled to the processor and configured to save a plurality of parameters of rotating the pixel molecules of the image;

wherein the processor acquires the color tone status of the image during a predetermined time interval according to an input signal of the liquid crystal display panel, rotates pixel molecules of at least one region of a plurality of regions of the image by using a pixel inversion process when the color tone status is maintained at a steady state, and after the pixel molecules of the at least one region of the image are rotated, the processor suspends the pixel inversion process of the image when the color tone status is changed from the steady state to an unstable state; and wherein when the color tone status is maintained at the steady state during a steady image interval, the liquid crystal display panel is prone to triggering the image sticking effect, and a length of the predetermined time interval is smaller than a length of the steady image interval.

10. The system of claim 9, wherein the processor continuously acquires parameters with three-primary colors of each pixel of the image during the predetermined time interval according to the input signal of the liquid crystal display panel and generates an average value of parameters with at least one primary color according to the parameters with three-primary colors of all pixels of the image, and the parameters with at least one primary color are parameters with at least one of red color, green color, and blue color.

11. The system of claim 10, wherein the processor rotates the pixel molecules of the at least one region of the plurality of regions of the image by using the pixel inversion process when a variation of the average value of the parameters with the at least one primary color during the predetermined time interval is smaller than a threshold.

12. The system of claim 11, wherein the processor continuously acquires parameters with three-primary colors of each pixel of the image during the predetermined time interval according to the input signal of the liquid crystal display panel and generates an average value of the parameters with three-primary colors of all pixels of the image.

13. The system of claim 9, wherein the plurality of parameters saved in the memory comprise a shape and a pixel amount of each region of the plurality of regions of the image, and/or a period of rotating the pixel molecules of the at least one region of the plurality of regions of the image, and the processor periodically rotates the pixel molecules of the at least one region randomly selected from the plurality of regions of the image.

14. The system of claim 9, wherein the processor rotates the pixel molecules of partial or entire pixels of the at least one region of the plurality of regions of the image simultaneously.

15. The system of claim 9, wherein when the plurality of regions are dotted regions, the processor uses a pixel dot-inversion process for rotating the pixel molecules, and when the plurality of regions are linear regions, the processor uses a pixel column-inversion process or a pixel row-inversion process for rotating the pixel molecules.

16. The system of claim 9, wherein the processor rotates the pixel molecules of all regions of the image by using a pixel frame-inversion process when the color tone status is maintained at the steady state.

17. The system of claim 9, wherein the plurality of parameters saved in the memory comprise the predetermined time interval.

* * * * *